United States Patent
Yang (10) Patent No.: US 9,900,308 B2
(45) Date of Patent: Feb. 20, 2018

(54) USER MODE CONTROL METHOD AND SYSTEM BASED ON IRIS RECOGNITION FOR MOBILE TERMINAL

(71) Applicant: HuiZhou TCL Mobile Communication Co., Ltd., HuiZhou (CN)

(72) Inventor: Yan Yang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 14/890,163

(22) PCT Filed: Sep. 2, 2014

(86) PCT No.: PCT/CN2014/085726
§ 371 (c)(1),
(2) Date: Nov. 10, 2015

(87) PCT Pub. No.: WO2016/000307
PCT Pub. Date: Jan. 7, 2016

(65) Prior Publication Data
US 2016/0156624 A1    Jun. 2, 2016

(30) Foreign Application Priority Data

Jun. 30, 2014  (CN) .......................... 2014 1 0302591

(51) Int. Cl.
*H04L 29/06*    (2006.01)
*G06F 21/32*    (2013.01)
(Continued)

(52) U.S. Cl.
CPC .......... *H04L 63/0861* (2013.01); *G06F 21/32* (2013.01); *G06F 21/6245* (2013.01);
(Continued)

(58) Field of Classification Search
CPC ....... G06F 21/32; G06F 21/30; H04L 63/0861
See application file for complete search history.

(56) References Cited

U.S. PATENT DOCUMENTS

| | | | | |
|---|---|---|---|---|
| 7,690,032 | B1 * | 3/2010 | Peirce ..................... | G06F 21/32 380/229 |
| 8,458,465 | B1 * | 6/2013 | Stern ....................... | G06F 21/32 709/229 |

(Continued)

FOREIGN PATENT DOCUMENTS

| CN | 1997188 | 7/2007 |
|---|---|---|
| CN | 102902935 | 1/2013 |

(Continued)

OTHER PUBLICATIONS

Deng "Network Security Principle and Application", Cengage Learning, Bejing Institute of Technology, Book, p. 212, Jan. 31, 2011.—with an Abstract in English.

*Primary Examiner* — James R Turchen (57) ABSTRACT

A user mode control method and system based on iris recognition for mobile terminal are provided. When the mobile terminal receives an operation instruction of a user to start a display screen, iris feature data of the current user are scanned. The iris feature data of the current user are matched with iris feature data of users collected in advance, and the corresponding user mode is started when the match succeeds. The user mode control method and system prevents a stranger from accessing private data, and greatly improves security of the user data.

7 Claims, 2 Drawing Sheets

US 9,900,308 B2
Page 2

(51) Int. Cl.
*G06F 21/62* (2013.01)
*H04W 12/06* (2009.01)
*H04W 12/08* (2009.01)
*G06F 21/31* (2013.01)

(52) U.S. Cl.
CPC ............ *H04L 63/10* (2013.01); *H04L 63/101* (2013.01); *H04L 63/102* (2013.01); *H04W 12/06* (2013.01); *H04W 12/08* (2013.01); *G06F 21/31* (2013.01)

(56) References Cited

U.S. PATENT DOCUMENTS

| | | | | |
|---|---|---|---|---|
| 9,639,680 | B2* | 5/2017 | Chandra | G06F 21/31 |
| 2002/0152402 | A1* | 10/2002 | Tov | G06Q 30/02 726/4 |
| 2005/0187980 | A1* | 8/2005 | Carlin | G06F 17/3056 |
| 2005/0197859 | A1* | 9/2005 | Wilson | G06F 19/323 705/2 |
| 2006/0043169 | A1* | 3/2006 | Haertel | G06Q 20/10 235/379 |
| 2007/0092114 | A1* | 4/2007 | Ritter | G06F 21/32 382/115 |
| 2007/0248242 | A1* | 10/2007 | Ritter | G07C 9/00158 382/100 |
| 2010/0228692 | A1* | 9/2010 | Guralnik | G06K 9/6293 706/12 |
| 2012/0148115 | A1* | 6/2012 | Birdwell | G06K 5/00 382/116 |
| 2012/0185435 | A1* | 7/2012 | Misra | G06F 21/6218 707/638 |
| 2013/0290136 | A1 | 10/2013 | Sheets et al. | |
| 2014/0079296 | A1 | 3/2014 | Cleland et al. | |
| 2014/0123273 | A1* | 5/2014 | Matus | G06F 21/32 726/17 |
| 2014/0181959 | A1* | 6/2014 | Li | G06F 21/32 726/19 |
| 2014/0248941 | A1* | 9/2014 | Nelson | G07F 17/3241 463/25 |
| 2015/0067822 | A1* | 3/2015 | Randall | G06F 21/32 726/17 |
| 2015/0106891 | A1* | 4/2015 | Soni | H04L 63/0861 726/6 |
| 2015/0113631 | A1* | 4/2015 | Lerner | G06F 21/32 726/16 |
| 2015/0220537 | A1* | 8/2015 | Cosgrove | G06F 17/3005 707/693 |
| 2015/0223731 | A1* | 8/2015 | Sahin | A61B 5/16 600/301 |
| 2015/0358316 | A1* | 12/2015 | Cronin | H04L 63/0861 726/6 |
| 2016/0173455 | A1* | 6/2016 | Ramachandra Rao | H04L 63/0861 713/168 |

FOREIGN PATENT DOCUMENTS

| | | |
|---|---|---|
| CN | 103218142 | 7/2013 |
| CN | 103678981 | 3/2014 |

* cited by examiner

USER MODE CONTROL METHOD AND SYSTEM BASED ON IRIS RECOGNITION FOR MOBILE TERMINAL

RELATED APPLICATIONS

This application is a National Phase of PCT Patent Application No. PCT/CN2014/085726 having International filing date of Sep. 2, 2014, which claims the benefit of priority of Chinese Patent Application No. 201410302591.8 filed on Jun. 30, 2014. The contents of the above applications are all incorporated by reference as if fully set forth herein in their entirety.

TECHNICAL FIELD OF THE INVENTION

The present invention relates to an iris recognition technology, and in particular to a user mode control method and system based on iris recognition for a mobile terminal.

BACKGROUND OF THE INVENTION

With the increasing development of mobile communications and the raising of people's living standards, usage of various mobile terminals such as mobile phones is increasingly popular, and mobile phones have become indispensable communication tools in people's lives.

Data in the mobile terminals such as mobile phones usually have different levels of privacy. However, owners of the mobile terminals often lend their devices to their family members or friends. If some important private files are not encrypted locked, they are very easily seen. If the owner of a mobile device accidentally loses the mobile terminal, and if it is picked up by a stranger, some information relating to the privacy and some important contents such as Alipay passwords, IM account passwords, and even bank card information, etc. are likely to leak.

At present, many mobile terminals are equipped with three user modes, e.g. a main mode, a child mode, and a guest mode. When the owner of the mobile terminal (i.e. possessor) lends the mobile terminal to others, he or she does not want others to view stored private photos, videos, text messages, and other private data. The owner needs to manually key-in a security password set in advance, switch to the guest mode, and then lend the mobile terminal to others. It can be seen from the foregoing that the user mode of the mobile terminal needs to be manually switched, and this operation is very tedious.

Thus, there is a requirement to improve and develop the prior art.

SUMMARY OF THE INVENTION

The technical problem which the present invention needs to solve is to provide a user mode control method and system based on iris recognition for a mobile terminal for the above-mentioned disadvantage in the prior art. The present invention mainly applies the iris recognition technology to the mobile terminal for user identification, privacy protection, and information security.

A technical solution of the present invention is implemented as follows.

A user mode control method based on iris recognition for a mobile terminal includes: collecting iris feature data of a plurality of users in advance by the mobile terminal, packaging the iris feature data of the users to store them to a plurality of user iris groups which are pre-set, and setting a plurality of user modes which correspond one-to-one to the user iris groups; prompting a user to aim eyes at a camera by popping up a prompt box when the mobile terminal receives an operation instruction of the user to start a display screen; acquiring the iris feature data of the current user by the camera when the camera detects the eyes of the user aiming at the camera; determining whether the mobile terminal receives an operation instruction of the current user to select the user iris groups for carrying out a simple match; matching the iris feature data of the current user with the iris feature data of the users collected in advance by the mobile terminal if not, and starting the corresponding user mode when the match succeeds; matching the iris feature data of the current user with the iris feature data stored in the user iris group selected by the current user if yes, and starting the user mode corresponding to the user iris group selected by the current user when the match succeeds.

The user modes herein include a main mode, a family mode, a friend mode, and a stranger mode.

The user mode control method herein based on iris recognition for the mobile terminal further includes: locking the mobile terminal when the match fails.

The user mode control method herein based on iris recognition for the mobile terminal further includes: starting the stranger mode when the match fails.

The step of packaging the iris feature data of the users to store them to the user iris groups which are pre-set and setting the user modes which correspond one-to-one to the user iris groups specifically is: dividing a region within mobile terminal in which the iris feature data stored into four regions, an owner region of the iris feature data, a family region of the iris feature data, a friend region of the iris feature data, and a stranger region of the iris feature data, respectively; storing owner iris groups to the owner region of the iris feature data, storing family iris groups to the family region of the iris feature data, storing friend iris groups to the friend region of the iris feature data, and storing stranger iris groups to the stranger region of the iris feature data; and setting a corresponding permission for each of the user iris groups after the iris feature data are stored in classification, and acquiring the corresponding user modes.

The step of starting the stranger mode when the match fails specifically is: if the iris feature data that matches the current user is not found in the stored owner iris groups, family iris groups and friend iris groups, then assuming that the current user belongs to the stranger iris groups, and starting the corresponding stranger user mode.

The owner iris groups correspond to a highest user permission, which is able to turn on all applications, make any settings, and view all photos, videos, and text message data; the family iris groups correspond to a second-highest user permission, which is able to turn on all applications, not able to make settings, and able to view partial photos, videos, and text message data; the friend iris groups correspond to a third-highest user permission, which is able to turn on partial applications, not able to make settings, and not able to view photos, videos, and text message data; the stranger iris groups correspond to a fourth-highest user permission, which is not able to turn on applications, not able to make settings, and not able to view photos, videos, and text message data.

A user mode control method based on iris recognition for a mobile terminal includes: collecting iris feature data of a plurality of users in advance by the mobile terminal, packaging the iris feature data of the users to store them to a plurality of user iris groups which are pre-set, and setting a plurality of user modes which correspond one-to-one to the user iris groups; scanning the iris feature data of a current user by a camera disposed on the mobile terminal when the mobile terminal receives an operation instruction of the user to start a display screen; matching the iris feature data of the current user with the iris feature data of the users collected in advance by the mobile terminal, and starting the corresponding user mode when the match succeeds.

The user modes herein include a main mode, a family mode, a friend mode, and a stranger mode.

The user mode control method herein based on iris recognition for the mobile terminal further includes: locking the mobile terminal when the match fails.

The user mode control method herein based on iris recognition for the mobile terminal further includes: starting the stranger mode when the match fails.

The step of scanning the iris feature data of a current user by a camera disposed on the mobile terminal when the mobile terminal receives an operation instruction of the user to start a display screen specifically includes: prompting a user to aim eyes at a camera by popping up a prompt box when the mobile terminal receives an operation instruction of the user to start a display screen; acquiring the iris feature data of the current user by the camera when the camera detects the eyes of the user aiming at the camera.

The step of matching the iris feature data of the current user with the iris feature data of the users collected in advance by the mobile terminal and starting the corresponding user mode when the match succeeds specifically comprises: determining whether the mobile terminal receives an operation instruction of the current user to select the user iris groups for carrying out a simple match; matching the iris feature data of the current user with the iris feature data of the users collected in advance by the mobile terminal if not, and starting the corresponding user mode when the match succeeds; matching the iris feature data of the current user with the iris feature data stored in the user iris group selected by the current user if yes, and starting the user mode corresponding to the user iris group selected by the current user when the match succeeds.

The step of packaging the iris feature data of the users to store them to the user iris groups which are pre-set and setting the user modes which correspond one-to-one to the user iris groups specifically is: dividing a region within mobile terminal in which the iris feature data are stored into four regions, an owner region of the iris feature data, a family region of the iris feature data, a friend region of the iris feature data, and a stranger region of the iris feature data, respectively; storing owner iris groups to the owner region of the iris feature data, storing family iris groups to the family region of the iris feature data, storing friend iris groups to the friend region of the iris feature data, and storing stranger iris groups to the stranger region of the iris feature data; and setting a corresponding permission for each of the user iris groups after the iris feature data are stored in classification, and acquiring the corresponding user modes.

The step of starting the stranger mode when the match fails specifically is: if the iris feature data that matches the current user is not found in the stored owner iris groups, family iris groups, and friend iris groups, then assuming that the current user belongs to the stranger iris groups, and starting the corresponding stranger user mode.

A user mode starting system based on iris recognition for a mobile terminal includes: a setting module utilized to collect iris feature data of users in advance by the mobile terminal, to package the iris feature data of the users to store them to a plurality of user iris groups which are pre-set, and to set a plurality of user modes which correspond one-to-one to the user iris groups; an iris acquiring module utilized to scan the iris feature data of a current user by a camera disposed on the mobile terminal when the mobile terminal receives an operation instruction of the user to start a display screen; and a matching and starting module utilized to match the iris feature data of the current user with the iris feature data of the users collected in advance by the mobile terminal, and to start the corresponding user mode when the match succeeds.

The user modes herein include a main mode, a family mode, a friend mode, and a stranger mode. The matching and starting module herein is further utilized to lock the mobile terminal or start the stranger mode when the match fails.

The iris acquiring module herein specifically comprises: a prompting unit utilized to prompt a user to aim eyes at a camera by popping up a prompt box when the mobile terminal receives an operation instruction of the user to start a display screen; and an iris acquiring unit utilized to acquire the iris feature data of the current user by the camera when the camera detects the eyes of the user aiming at the camera.

The matching and starting module herein specifically comprises: a simple match selecting unit utilized to determine whether mobile terminal receives an operation instruction of the current user to select the user iris groups for carrying out a simple match, and to start a full matching and starting unit if not, and to start a simple matching and starting unit if yes; the full matching and starting unit utilized to match the iris feature data of the current user with the iris feature data of the users collected in advance by the mobile terminal, and to start the corresponding user mode when the match succeeds; the simple matching and starting unit utilized to match the iris feature data of the current user with the iris feature data stored in the user iris group selected by the current user, and starting the user mode corresponding to the user iris group selected by the current user when the match succeeds.

The present invention discloses a user mode control method and system based on iris recognition for mobile terminal, both of which include: collecting iris feature data of a plurality of users in advance by the mobile terminal, packaging the iris feature data of the users to store them to a plurality of user iris groups which are pre-set, and setting a plurality of user modes which correspond one-to-one to the user iris groups; scanning the iris feature data of a current user by a camera disposed on the mobile terminal when the mobile terminal receives an operation instruction of the user to start a display screen; matching the iris feature data of the current user with the iris feature data of the users collected in advance by the mobile terminal, and starting the corresponding user mode when the match succeeds. The user mode control method employing the iris recognition of the present invention utilizes a result of the iris recognition to determine to start which user mode, thereby preventing a stranger from entering the owner mode of the terminal and accessing private data, greatly improving the security of the user data.

DETAILED DESCRIPTION OF THE INVENTION

The user mode control method and system based on iris recognition for mobile terminal provided by the present invention mainly employs an iris recognition technology, which has uniqueness, stability, and immutability. The exterior of a human eye consists of three parts: sclera, iris, and pupil. The iris is an annular portion located between the black sclera and the white pupil, and the annular portion includes many interlaced minutiae features that are similar to spots, filaments, coronals, stripes, and crypts. These features can uniquely identify a person's identity. Except for rare abnormal status, e.g. except that large physical or mental trauma may cause changes in the appearance of the iris, the appearance of the iris can be maintained for several decades without many changes. On the other hand, the iris is externally visible, but it belongs to internal organizations, which are located behind the cornea. Modifying the appearance of the iris not only requires a very delicate surgery, but also risks the danger of visual impairment.

In using the mobile terminal such as mobile phones, tablet PCs or other computing devices with a camera function, the user usually sets a security measure such as passwords and pattern locks.

However, the above safety measures are easily broken by others, thereby unlocking the mobile terminal for further use. When the private photos, videos, text messages, personal bank accounts, and other private contents in the mobile terminal are viewed by others, it might bring great losses to the owner of the mobile terminal.

To make the objectives, technical solutions and advantages of the present disclosure clearer, the present disclosure will be further described herein below with reference to the attached drawings and embodiments thereof. It should be understood that the specific embodiment described herein is merely utilized to explain the present invention but not to limit the present invention.

Figure 1:
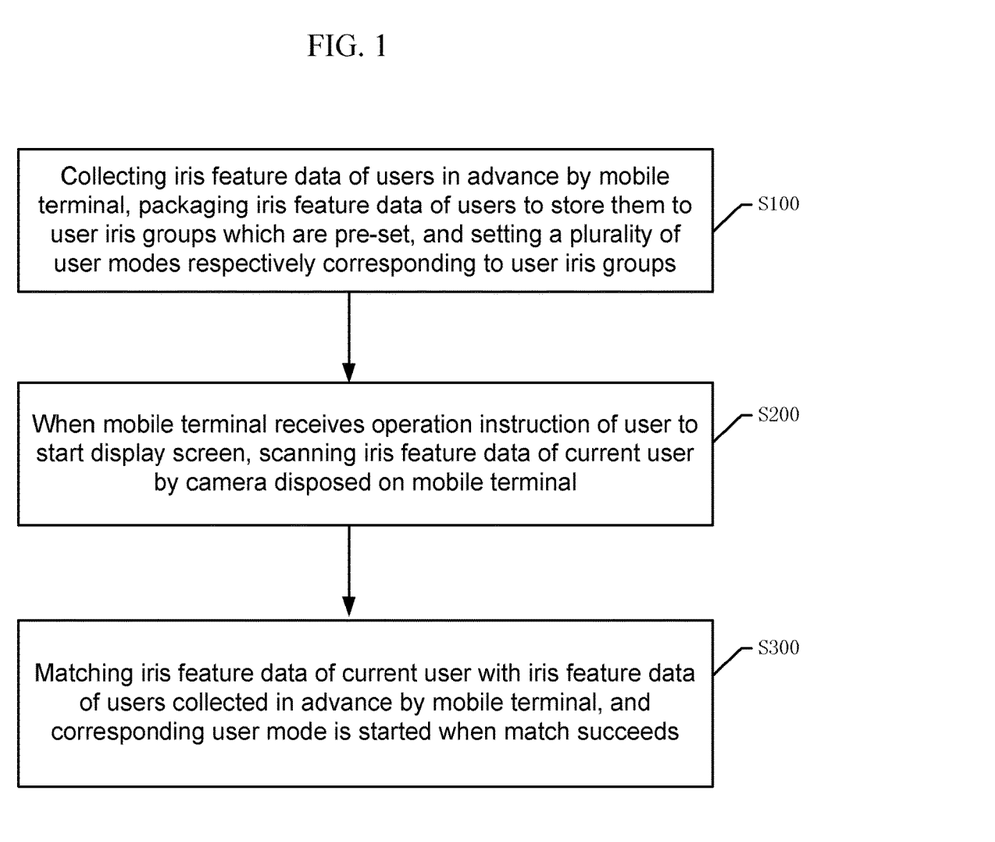
FIG. 1 is a flow chart illustrating a user mode control method based on face recognition for a mobile terminal according to one preferred embodiment of the present invention.

Refer to FIG. 1, which is a flow chart illustrating a user mode control method based on face recognition for a mobile terminal according to one preferred embodiment of the present invention. The user mode control method based on iris recognition for a mobile terminal shown in FIG. 1 includes: step S100, collecting iris feature data of a plurality of users in advance by the mobile terminal, packaging the iris feature data of the users to store them to a plurality of user iris groups which are pre-set, and setting a plurality of user modes which correspond one-to-one to the user iris groups.

That is, when a user uses the mobile terminal, the user employs a camera of the mobile terminal itself to train it on eyeballs of the use for collecting the iris feature data of the user in advance. In the process of collecting the iris feature data of the user in advance, the owner of the mobile terminal needs to collect not only his or her iris feature data but the iris feature data of relatives and friends. During packaging the iris feature data to store them, a plurality of user iris groups, which are utilized to store the iris feature data in classification, can be established in the mobile terminal. For example, a region within mobile terminal in which the iris feature data stored is divided into four regions, an owner region of the iris feature data, a family region of the iris feature data, a friend region of the iris feature data, and a stranger region of the iris feature data, respectively. The above four regions correspondingly store the iris feature data of the four user iris groups, respectively. That is, owner iris groups are stored to the owner region of the iris feature data; family iris groups are stored to the family region of the iris feature data; friend iris groups are stored to the friend region of the iris feature data; stranger iris groups are stored to the stranger region of the iris feature data. After the iris feature data are stored in classification, a corresponding permission for each of the user iris groups is set, and the corresponding user modes are acquired.

Step S200, when the mobile terminal receives an operation instruction of the user to start a display screen, the iris feature data of the current user are scanned by the camera disposed on the mobile terminal.

That is, when the user turns on the display screen of the mobile terminal, it does not enter a main desktop of the mobile terminal immediately but starts the camera of the mobile terminal to collect the iris feature data of the current user. Since the main desktop of the mobile terminal cannot be accessed and then be normally used by starting the display screen of the mobile terminal, the security of the user data is greatly improved.

Step S300, the iris feature data of the current user are matched with the iris feature data of the users collected in advance by the mobile terminal, and the corresponding user mode is started when the match succeeds.

That is, the iris feature data of the current user are matched with the iris feature data stored in the plurality of user iris groups. When the iris feature data which match the iris feature data of the current user are found in one of the user iris groups, the user mode of the corresponding user iris group is started.

Furthermore, the user modes of the embodiment include a main mode, a family mode, a friend mode, and a stranger mode.

The plurality of user iris groups are set in the step S100, and the user modes which correspond one-to-one to the user iris groups are set. In specific implementation, the owner iris groups correspond to a highest user permission, which is able to turn on all applications, make any settings, and view all photos, videos and text message data; that is, the user mode that is set to correspond to the owner iris groups is a main mode. The family iris groups correspond to a second-highest user permission, which is able to turn on all applications, not able to make settings, and able to view partial photos, videos and text message data; that is, the user mode that is set to correspond to the family iris groups is a family mode. The friend iris groups correspond to a third-highest user permission, which is able to turn on partial applications, not able to make settings, and not able to view photos, videos and text message data; that is, the user mode that is set to correspond to the friend iris groups is a friend mode. The stranger iris groups correspond to a fourth-highest user permission, which is not able to turn on applications, not able to make settings, and not able to view photos, videos and text message data. The above contents are just utilized to give examples. The user iris groups which can be stored in the terminal include but not limited to the above user iris groups, and the user modes which can be set by the terminal include but not limited to the above user modes. The user iris groups and the user modes have properties of increase, edition, modification, and deletion.

Furthermore, the step S300 of matching the iris feature data and stating the corresponding user mode further includes: locking the mobile terminal or starting the stranger mode when the match fails.

Although the stranger iris groups have been set, and the stranger mode is set correspondingly in the step S100, the owner of the mobile terminal does not seek to collect the iris feature data of strangers, so the stranger iris groups do not store any iris feature data. Meanwhile, if the iris feature data that matches the current user is not found in the stored owner iris groups, family iris groups and friend iris groups, then the current user is assumed to belong to the stranger iris groups, and the corresponding stranger user mode is started.

In a further embodiment, the step S200 of acquiring the iris feature data of the current user specifically includes: step S201, prompting the user to aim his or her eyes at a camera by popping up a prompt box when the mobile terminal receives an operation instruction of the user to start a display screen; when the current user of the mobile terminal starts the display screen, the display screen of the mobile terminal pops up the prompt box to prompt the user to aim the eyes at the camera. Through the prompting function of the mobile terminal, the user can timely acquire the prompt for the next operation after starting the display screen, which greatly facilitates the user.

Step S202, when the camera detects the eyes of the user aiming at the camera, the iris feature data of the current user are acquired by the camera.

That is, when the camera detects that the eyes of the user have aimed at the camera, the camera acquires the iris feature data of the current user by continuous shooting, continuous recording or other scanning manners.

In a further embodiment, the step S300 of matching the iris feature data and stating the corresponding user mode specifically includes: step S301, determining whether the mobile terminal receives an operation instruction of the current user to select the user iris groups for carrying out a simple match, if not, then entering step S302, if yes, then entering step S303; step S302, matching the iris feature data of the current user with the iris feature data of the users collected in advance by the mobile terminal, and starting the corresponding user mode when the match succeeds; and step S303, matching the iris feature data of the current user with the iris feature data stored in the user iris group selected by the current user, and starting the user mode corresponding to the user iris group selected by the current user when the match succeeds.

That is, when the current user has been informed that the iris feature data are stored in which user iris group by the owner of the mobile terminal, the current user selects the corresponding user iris group, and the iris feature data of the current user are compared and matched with all the iris feature data stored in the selected user iris group. When the match succeeds, the user mode corresponding to the user iris group selected by the current user is started. If the current user does not know which iris group their iris feature data is stored in, the iris feature data of the current user are matched with all the iris feature data, which are collected in advance and stored in the mobile terminal, and when the match succeeds, the user mode corresponding to the user iris group selected by the current user is started.

It should be noted that the above embodiment preferably requires to starting the camera of the mobile terminal for collecting the iris feature data of the current user. However, in other embodiments, the user mode can also be switched by manual starting during using the mobile terminal, then the iris feature data of the current user are collected, and the subsequent related steps are performed in order to enrich the operating experience for the user.

Notably, the present invention provides a user mode control method based on iris recognition for a mobile terminal, which utilizes the result of the iris recognition to determine which user mode of the mobile terminal to start without manually switching the user mode by the user, whereby the operation is simple, practical, and convenient. Meanwhile, the uniqueness of the iris of the owner of the mobile terminal is utilized to start the main mode, thereby improving information security of the private data of the owner of the mobile terminal.

Figure 2:
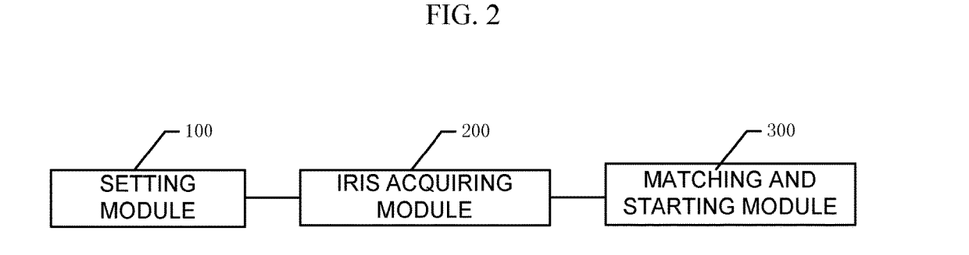
FIG. 2 is a block diagram illustrating a user mode starting system based on iris recognition for a mobile terminal according to one preferred embodiment of the present invention.

Based on the above-mentioned embodiment, as shown in FIG. 2, the present invention further provides a user mode starting system based on iris recognition for a mobile terminal, which includes: a setting module 100 which is utilized to collect iris feature data of users in advance by the mobile terminal, to package the iris feature data of the users to store them to a plurality of user iris groups which are pre-set, and to set a plurality of user modes which correspond one-to-one to the user iris groups; the specific description is mentioned above.

An iris acquiring module 200 is utilized to scan the iris feature data of a current user by a camera disposed on the mobile terminal when the mobile terminal receives an operation instruction of the user to start a display screen; the specific description is mentioned above.

A matching and starting module 300 is utilized to match the iris feature data of the current user with the iris feature data of the users collected in advance by the mobile terminal, and to start the corresponding user mode when the match succeeds; the specific description is mentioned above.

In a further embodiment, the user modes herein include a main mode, a family mode, a friend mode, and a stranger mode; the specific description is mentioned above.

In a further embodiment, the matching and starting module 300 is further utilized to lock the mobile terminal or start the stranger mode when the match fails; the specific description is mentioned above.

In a further embodiment, the iris acquiring module 200 specifically includes: a prompting unit utilized to prompt a user to aim eyes at a camera by popping up a prompt box when the mobile terminal receives an operation instruction of the user to start a display screen; the specific description is mentioned above.

An iris acquiring unit is utilized to acquire the iris feature data of the current user by the camera when the camera detects the eyes of the user aiming at the camera; the specific description is mentioned above.

In a further embodiment, the matching and starting module 300 specifically includes: a simple match selecting unit utilized to determine whether the mobile terminal receives an operation instruction of the current user to select the user iris groups for carrying out a simple match, and to start a full matching and starting unit if not, and to start a simple matching and starting unit if yes; the specific description is mentioned above.

The full matching and starting unit is utilized to match the iris feature data of the current user with the iris feature data of the users collected in advance by the mobile terminal, and to start the corresponding user mode when the match succeeds; the specific description is mentioned above.

The simple matching and starting unit is utilized to match the iris feature data of the current user with the iris feature data stored in the user iris group selected by the current user. When the match succeeds, the user mode corresponding to the user iris group selected by the current user is started; the specific description is mentioned above.

The user mode starting system based on iris recognition for a mobile terminal is formed in a terminal such as a computer, a tablet computer, and a cell phone. The mobile terminal user mode control method based on the iris recognition technology provided in the above-described embodiments and the user mode control system based on the iris recognition technology belong to the same concept. The mobile terminal user mode control system based on the iris recognition technology can run any method provided in the embodiments of the mobile terminal user mode control method based on the iris recognition technology, and implementation thereof is referred to the embodiments of the mobile terminal user mode control method based on the iris recognition technology and is not detailed herein.

It should be noted that as to the user mode control method based on iris recognition for mobile terminal of the embodiment of the present invention, it should be understood for an ordinary person in this field that partial or full processes carrying out the mobile terminal user mode control method based on the iris recognition technology provided in the embodiment of the present invention can be accomplished by related hardware instructed by a computer program. The computer program can be stored in a computer-readable storage medium such as a memory in a terminal and is executed by at least one processor in the terminal. The computer program may include the processes of the embodiments of the above methods in the execution process. The storage medium can be a disk, an optical disc, a read-only memory (ROM), or a random access memory (RAM), etc.

As to the user mode starting system based on iris recognition for a mobile terminal of the embodiment of the present invention, the respective functional modules can be integrated into one processing chip, or each of the modules may exist alone physically, or else two or more than two modules are integrated into one module. The aforementioned integrated module can be implemented in a form of hardware or a form of software functional modules. When the integrated module is implemented in the form of software functional modules and sold or used as an independent product, the integrated module may be stored in a computer-readable storage medium such as a read-only memory, a disk, or an optical disc.

In summary, the present invention discloses a user mode control method and system based on iris recognition for a mobile terminal for collecting iris feature data of a plurality of users in advance by the mobile terminal, packaging the iris feature data of the users to store them to a plurality of user iris groups which are pre-set, and setting a plurality of user modes which correspond one-to-one to the user iris groups; scanning the iris feature data of a current user by a camera disposed on the mobile terminal when the mobile terminal receives an operation instruction of the user to start a display screen; and matching the iris feature data of the current user with the iris feature data of the users collected in advance by the mobile terminal, and starting the corresponding user mode when the match succeeds. The user mode control method employing the iris recognition of the present invention utilizes a result of the iris recognition to determine which user mode to start, thereby preventing a stranger from entering the owner mode of the terminal and accessing private data, greatly improving the security of the user data.

It shall be understood that applications of the present disclosure are not limited to what is described above. Those of ordinary skill in the art may make modifications or variations according to the above description, and all of these modifications and variations shall be covered within the scope of the attached claims of the present disclosure.

What is claimed is:

1. A user mode control method based on iris recognition for a mobile terminal, comprising:

collecting iris feature data of a plurality of users in advance by the mobile terminal, packaging the iris feature data of the users to store them to a plurality of user iris groups which are pre-set, and setting a plurality of user modes which correspond one-to-one to the user iris groups; wherein the step of packaging the iris feature data of the users to store them to the user iris groups which are pre-set and setting the user modes which correspond one-to-one to the user iris groups specifically comprises: dividing a region within mobile terminal in which the iris feature data are stored into four regions, an owner region of the iris feature data, a family region of the iris feature data, a friend region of the iris feature data, and a stranger region of the iris feature data, respectively; storing owner iris groups to the owner region of the iris feature data, storing family iris groups to the family region of the iris feature data, storing friend iris groups to the friend region of the iris feature data, and storing stranger iris groups to the stranger region of the iris feature data; and setting a corresponding permission for each of the user iris groups after the iris feature data are stored in classification, and acquiring the corresponding user modes; wherein the user modes comprise a main mode, a family mode, a friend mode, and a stranger mode; wherein the stranger iris groups correspond to a user permission which is not able to turn on applications, not able to make settings, and not able to view photos, videos and text message data;

prompting a user to aim eyes at a camera by popping up a prompt box when the mobile terminal receives an operation instruction of the user to start a display screen;

acquiring the iris feature data of the current user by the camera when the camera detects the eyes of the user aiming at the camera;

determining whether the mobile terminal receives an operation instruction of the current user to select the user iris groups for carrying out a simple match;

matching the iris feature data of the current user with the iris feature data of the users collected in advance by the mobile terminal if not, and starting the corresponding user mode when the match succeeds; matching the iris feature data of the current user with the iris feature data stored in the user iris group selected by the current user if yes, and starting the user mode corresponding to the user iris group selected by the current user when the match succeeds; and starting the stranger mode when the match fails, wherein the step of starting the stranger mode when the match fails specifically comprises: assuming that the current user belongs to the stranger iris groups, and starting the corresponding stranger user mode if the iris feature data that matches the current user is not found in the stored owner iris groups, family iris groups and friend iris groups;

wherein:

the owner iris groups correspond to a highest user permission, which is able to turn on all applications, make any settings, and view all photos, videos and text message data;

the family iris groups correspond to a second-highest user permission, which is able to turn on all applications, not able to make settings, and able to view partial photos, videos and text message data;

the friend iris groups correspond to a third-highest user permission, which is able to turn on partial applications, not able to make settings, and not able to view photos, videos and text message data.

2. A user mode control method based on iris recognition for a mobile terminal, comprising:

collecting iris feature data of a plurality of users in advance by the mobile terminal, packaging the iris feature data of the users to store them to a plurality of user iris groups which are pre-set, and setting a plurality of user modes which correspond one-to-one to the user iris groups; wherein the step of packaging the iris feature data of the users to store them to the user iris groups which are pre-set and setting the user modes which correspond one-to-one to the user iris groups specifically comprises: dividing a region within mobile terminal in which the iris feature data are stored into four regions, an owner region of the iris feature data, a family region of the iris feature data, a friend region of the iris feature data, and a stranger region of the iris feature data, respectively; storing owner iris groups to the owner region of the iris feature data, storing family iris groups to the family region of the iris feature data, storing friend iris groups to the friend region of the iris feature data, and storing stranger iris groups to the stranger region of the iris feature data; and setting a corresponding permission for each of the user iris groups after the iris feature data are stored in classification, and acquiring the corresponding user modes; wherein the user modes comprise a main mode, a family mode, a friend mode, and a stranger mode; wherein the stranger iris groups correspond to a user permission which is not able to turn on applications, not able to make settings, and not able to view photos, videos and text message data;

scanning the iris feature data of a current user by a camera disposed on the mobile terminal when the mobile terminal receives an operation instruction of the user to start a display screen; and matching the iris feature data of the current user with the iris feature data of the users collected in advance by the mobile terminal, and starting the corresponding user mode when the match succeeds; and starting the stranger mode when the match fails, wherein the step of starting the stranger mode when the match fails specifically comprises: assuming that the current user belongs to the stranger iris groups, and starting the corresponding stranger user mode if the iris feature data that matches the current user is not found in the stored owner iris groups, family iris groups and friend iris groups;

wherein the owner iris groups correspond to a highest user permission, which is able to turn on all applications, make any settings, and view all photos, videos and text message data;

the family iris groups correspond to a second-highest user permission, which is able to turn on all applications, not able to make settings, and able to view partial photos, videos and text message data;

the friend iris groups correspond to a third-highest user permission, which is able to turn on partial applications, not able to make settings, and not able to view photos, videos and text message data.

3. The user mode control method according to claim 2, wherein the step of scanning the iris feature data of a current user by a camera disposed on the mobile terminal when the mobile terminal receives an operation instruction of the user to start a display screen specifically comprises:

prompting a user to aim eyes at a camera by popping up a prompt box when the mobile terminal receives an operation instruction of the user to start a display screen; and acquiring the iris feature data of the current user by the camera when the camera detects the eyes of the user aiming at the camera.

4. The user mode control method according to claim 2, wherein the step of matching the iris feature data of the current user with the iris feature data of the users collected in advance by the mobile terminal and starting the corresponding user mode when the match succeeds specifically comprises:

determining whether the mobile terminal receives an operation instruction of the current user to select the user iris groups for carrying out a simple match;

matching the iris feature data of the current user with the iris feature data of the users collected in advance by the mobile terminal if not, and starting the corresponding user mode when the match succeeds; and matching the iris feature data of the current user with the iris feature data stored in the user iris group selected by the current user if yes, and starting the user mode corresponding to the user iris group selected by the current user when the match succeeds.

5. A user mode starting system based on iris recognition for a mobile terminal, comprising:

a setting module utilized to collect iris feature data of users in advance by the mobile terminal, to package the iris feature data of the users to store them to a plurality of user iris groups which are pre-set, and to set a plurality of user modes which correspond one-to-one to the user iris groups; wherein when packaging the iris feature data of the users to store them to a plurality of user iris groups which are pre-set and to set a plurality of user modes which correspond one-to-one to the user iris groups, the setting module further divides a region within mobile terminal in which the iris feature data are stored into four regions, an owner region of the iris feature data, a family region of the iris feature data, a friend region of the iris feature data, and a stranger region of the iris feature data, respectively; stores owner iris groups to the owner region of the iris feature data, stores family iris groups to the family region of the iris feature data, stores friend iris groups to the friend region of the iris feature data, and stores stranger iris groups to the stranger region of the iris feature data; and sets a corresponding permission for each of the user iris groups after the iris feature data are stored in classification, and acquires the corresponding user modes; wherein the user modes comprise a main mode, a family mode, a friend mode, and a stranger mode; wherein the stranger iris groups correspond to a user permission which is not able to turn on applications, not able to make settings, and not able to view photos, videos and text message data;

an iris acquiring module utilized to scan the iris feature data of a current user by a camera disposed on the mobile terminal when the mobile terminal receives an operation instruction of the user to start a display screen; and a matching and starting module utilized to match the iris feature data of the current user with the iris feature data of the users collected in advance by the mobile terminal, and to start the corresponding user mode when the match succeeds; wherein the matching and starting module is further utilized to start the stranger mode when the match fails; wherein when starting the stranger mode, the matching and starting module is further utilized to assume that the current user belongs to the stranger iris groups and start the corresponding stranger user mode if the iris feature data that matches the current user is not found in the stored owner iris groups, family iris groups and friend iris groups;

wherein the owner iris groups correspond to a highest user permission, which is able to turn on all applications, make any settings, and view all photos, videos and text message data;

the family iris groups correspond to a second-highest user permission, which is able to turn on all applications, not able to make settings, and able to view partial photos, videos and text message data;

the friend iris groups correspond to a third-highest user permission, which is able to turn on partial applications, not able to make settings, and not able to view photos, videos and text message data.

6. The user mode starting system according to claim 5, wherein the iris acquiring module specifically comprises:

a prompting unit utilized to prompt a user to aim eyes at a camera by popping up a prompt box when the mobile terminal receives an operation instruction of the user to start a display screen; and an iris acquiring unit utilized to acquire the iris feature data of the current user by the camera when the camera detects the eyes of the user aiming at the camera.

7. The user mode starting system according to claim 5, wherein the matching and starting module specifically comprises:

a simple match selecting unit utilized to determine whether the mobile terminal receives an operation instruction of the current user to select the user iris groups for carrying out a simple match, and to start a full matching and starting unit if not, and to start a simple matching and starting unit if yes;

the full matching and starting unit utilized to match the iris feature data of the current user with the iris feature data of the users collected in advance by the mobile terminal, and to start the corresponding user mode when the match succeeds;

the simple matching and starting unit utilized to match the iris feature data of the current user with the iris feature data stored in the user iris group selected by the current user, and to start the user mode corresponding to the user iris group selected by the current user.

* * * * *